Patented June 23, 1931

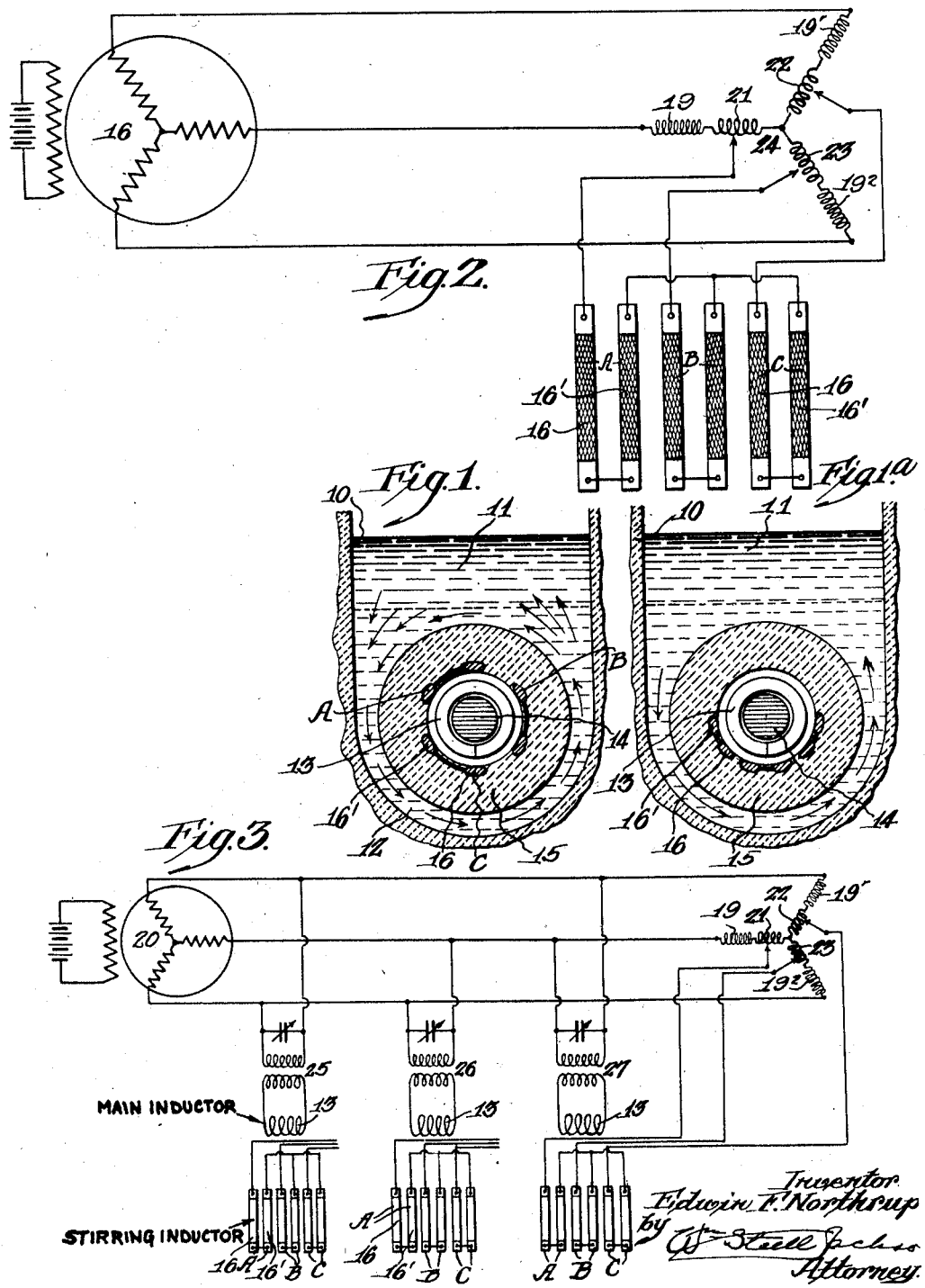

1,811,644

UNITED STATES PATENT OFFICE

EDWIN FITCH NORTHRUP, OF PRINCETON, NEW JERSEY, ASSIGNOR TO AJAX ELECTROTHERMIC CORPORATION, OF AJAX PARK, NEW JERSEY, A CORPORATION OF NEW JERSEY

INDUCTION ELECTRIC FURNACE

Application filed March 14, 1929. Serial No. 347,020.

My invention relates to an electric furnace having a pool and a submerged channel for circulation which channel may at the same time be used for heating resistor purposes.

A purpose of my invention is to secure unidirectional flow of molten metal in the submerged vertical channel of a furnace of the type indicated, using a moving magnetic field.

A further purpose is to arrange polyphase inductor turns for producing uni-directional flow in a submerged loop channel of a furnace of the type indicated around the outside of an inductor heating coil so that both the heating inductor and the uni-directional stirring inductor are looped by the channel.

A further purpose is to make a stirring inductor of braided wires so that when embedded in refractory the inductor will stay tightly embedded despite expansions and contractions incident to thermal changes, I preferably also nickel plate the braided inductor to avoid its oxidation.

Further purposes will appear in the specification and in the claims.

I have elected to show one only of the different possible main forms of my invention, showing however a detail modification and selecting a main form that is practical and efficient in operation and which well illustrates the principles involved.

Figure 1 is a diagrammatic fragmentary view through a furnace of the type indicated and embodying one form of an important feature of my invention.

Figure 1a is a view generally similar to Figure 1 but showing a minor modification.

Figure 2 is a diagrammatic view showing the electric connections of the stirring coil of Figures 1 and 1a.

Figure 3 is a diagrammatic view of the electrical connections of an electric furnace plant embodying my invention and shows a single three phase generator supplying current to operate the heating inductors and stirring inductors of three of my electric furnaces.

Like numerals refer to like parts in all figures.

Describing in illustration and not in limitation and referring to the drawings:—

The invention is directed to a metallurgical electrical furnace 10 having a molten bath 11 and a submerged channel 12 which loops around a heating inductor 13. The furnace is most efficient when the channel is vertical.

The inductor 13 is shown wound as a single layer around a suitably laminated iron transformer core 14, both the heating inductor and the core being located within a horizontal tubular portion 15 of the furnace wall that is surrounded by the submerged loop.

I stir by polyphase currents using three phase by preference.

I arrange inductor turns A, B and C along the inside of the tubular wall 15, suitably insulated from the heating inductor 13.

These turns are adapted to be connected to the A, B and C phases of a three phase generator 16 and when thus connected to produce a travelling magnetic field in the molten metal of the loop 12 that causes the metal to circulate in a manner analogous to that in which the rotor of an induction motor is driven.

The invention is intended to provide uni-directional circulation in the submerged channel.

In Figure 1 I show the auxiliary stirring conductors A, B and C for a three-phase stirring system. They are spaced at angularly uniform distances around the outside circumference of the heating inductor 13; but this is not essential and I may arrange the stirring inductors only part way around the circumference of the main inductor, as in Figure 1a, where the stirring turns A, B and C are arranged along the lower portion of the channel so as to locate the motor drag upon the molten metal in the channel at that part of the channel where it will be most efficient in producing rotation.

An advantageous detail of my invention is directed to the construction of the stirring conductors.

Each conductor includes straight portions 16 and 16' that are parallel to the axis of the core 14 and are desirably embedded in an inner circumferential layer 17 of refractory, and a cross connector 18 between the spaced conductors 16 and 16'. I prefer to make the conductors 16 and 16' of braided copper wire so that repeated expansions and contractions incident to thermal changes may not loosen the inductor members from the refractory, and I may nickel plate or otherwise protect the braided conductor to avoid oxidation.

In Figure 2 corresponding A, B and C inductor turns are connected adjustably at 19, 19' and 19² to the inner and heavier turns 21, 22, 23 of an auto transformer 24 which in turn is connected to the three phase generator 20, the connections being those adapted to produce a moving magnetic field in the channel 12 corresponding to the three phase current through the inductor.

In Figure 3 I show the three-phase generator 20 connected through transformers 25, 26 and 27 to the main inductor coils 13 of three furnaces of the type indicated.

The stirring coils 28, 29 and 30 of these furnaces are connected to the same or different auto transformers 24.

It will be evident that the distribution of the polyphase stirring conductors about the path of the channel provides a continuous motor drag upon the metal in the channel; and that this drag is effective to cause circulation along the channel whatever the direction of the planes of the channel but is most effective where the planes of the channel are vertical.

It will be further evident that the number of phases used, of the polyphase current used, whether two or three or more, and the relation and connection of the conductors by which the drag is applied lengthwise of the channel, while important in securing the best results are not vital to the principles of my invention.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of maintaining circulation of molten metal in a submerged channel communicating with a molten furnace pool, which consists in electromagnetically applying a progressively advancing motor field drag lengthwise of the channel to produce uni-directional flow throughout the length of the channel and into and from the pool, thus mixing the metal of the channel with that of the pool.

2. The method of providing for circulation of molten metal in a submerged heating resistor communicating with a pool at both ends of the resistor, which consists in locating the resistor so that it discharges and receives metal in upward and downward directions and providing a poly-phase electromagnetic motor drag lengthwise of the channel.

3. The method of circulating molten metal in a submerged channel directly beneath a molten metal pool and communicating with it at both channel ends, which consists in producing a progressive electromagnetic field moving about the interior of the channel path lengthwise of the channel.

4. The method of operating an inductive electric furnace having a submerged channel resistor communicating with a molten pool, which consists in heating the molten metal within the resistor by the induction of a current flowing about a circular path within the resistor and substantially parallel to the planes of the resistor and in causing circulation of the molten metal in the resistor by the effect of poly-phase current traversing paths transverse to the planes of the resistor and progressively advancing about the resistor.

5. The method of causing stirring in a submerged channel loop type of induction furnace, which consists in passing poly-phase alternating current progressively back and forth through the loop and about the loop to cause movement of the molten metal in the same direction through the loop.

6. In an induction electric furnace, walls forming a pool and a channel beneath the pool and communicating with the pool, an inductor adapted to induce heating current lengthwise of the channel and separate induction means for producing electromagnetic drag lengthwise of the channel.

7. In an inductive electric furnace, walls forming a submerged loop channel and a bath having a higher level than the channel and with which the channel communicates at both ends, a plurality of conductors threaded through the loop back and forth and progressively along the loop and a poly-phase source of current connected with said conductors to produce a rotating field within them and thus to cause uni-directional molten metal flow along the channel.

8. In an induction electric furnace, walls forming a pool and a curved channel beneath the pool and communicating with the pool at both ends, a circular heating inductor coil within the channel for the metal in the channel and a circulating inductor coil arranged about the outside of the heating inductor and producing a magnetic drag lengthwise of the channel.

9. In an induction electric furnace, walls forming a pool and a channel beneath the pool and communicating with the pool at both ends, means for heating the molten metal and poly-phase electromagnetic drag means following the path of the channel and adapted to move the metal in the channel lengthwise of the channel in one direction.

10. In an inductive electric furnace walls forming a pool and a looped channel beneath the pool, a generally horizontal core spaced from and beneath the pool and passing through the channel, a heating inductor wound around the core, stirring turns ranged around the outside of the heating coil within the channel, tubular refractory around the stirring turns, connections for the heating inductor and three-phase connections for the stirring turns producing a travelling field moving along the channel.

11. In an inductive electric furnace, walls forming a pool and a submerged loop channel connecting with the pool at both ends, a plurality of conductors threaded through the loop and connected progressively to carry the current about the interior of the loop and at the same time back and forth through the loop and multi-phase source of current supply for the conductors adapted to induce current in the molten metal within the loop and progress the metal in the same direction through the loop.

12. In an induction electric furnace, walls forming a pool and a longitudinally curved channel beneath the pool communicating with the pool at both ends, electromagnetic means substantially co-axial with the channel curve for heating the molten metal, a winding comprising reversely extending conductors transverse with respect to the channel length, connections between the conductors along the channel length and poly-phase electric current supply for the winding whereby an electromagnetic drag is produced lengthwise of the channel.

13. In an induction electric furnace, walls forming a furnace pool and a channel beneath the pool and communicating with the pool at opposite channel ends, the lower part of the channel being longitudinally curved and of approximately uniform cross section throughout a considerable length, an inductor for heating the molten metal in the channel, a plurality of spaced conductors extending transversely and reversely at intervals of the channel length and poly-phase current supply providing a progressive electromagnetic drag in the same direction lengthwise of the channel.

14. In an inductor furnace, walls forming a furnace pool and a channel at its lower part of general circular length located directly beneath the channel and flaring upwardly into communication with the pool at both ends of the channel, a transformer core passing transversely through the channel and substantially co-axial with the circular channel length, an inductor winding about the transformer core, conductors extending transversely with respect to the channel, connected about the inductor in sets and poly-phase connections and current supply for said conductors whereby an electromagnetic drag is given to the molten metal in the channel in the same direction.

15. In an inductive electric furnace, walls forming a downwardly and upwardly extending loop channel and a bath receiving the ends of the channel, a generally horizontal refractory tube surrounded by the channel and the portion of the bath intermediate the channel ends and stirring inductors of braided copper wire embedded in the refractory of the tube.

16. In an inductive electric furnace, walls forming a downwardly and upwardly extending loop channel and a bath receiving the ends of the channel, a generally horizontal refractory tube surrounded by the channel and the portion of the bath intermediate the channel ends and stirring inductors of braided nickeled copper wire embedded in the refractory of the tube.

17. In an inductive electric furnace, walls forming a submerged loop channel and a bath receiving the ends of the channel, a stirring inductor surrounded by the loop and the portion of the bath intermediate the loop ends, said inductor including three turns, a three-phase auto-transformer, electrical connections between the turns and transformer, and a source of three-phase current connected to the transformer.

18. In an inductive electric furnace plant, a three-phase generator, three inductive electric furnaces of submerged channel type, each having a heating inductor energized by one of the phases of the generator and three-phase stirring coils, one for each furnace and each arranged progressively along the length of the channel and energized by the three phases of the generator.

19. In an inductive electric furnace plant, a poly-phase generator, an inductive electric furnace, submerged channel type, a heating inductor energized by one of the phases of the generator, a three-phase stirring coil energized by the three phases of the generator and a reversing switch in the inlet and outlet connection to each turn of the stirring coil.

EDWIN FITCH NORTHRUP.